Nov. 19, 1935.    J. H. VICTOR ET AL    2,021,571
LAMINATED COMPOSITION GASKET

Filed Feb. 21, 1934

JOHN H. VICTOR
JOSEPH B. VICTOR
WILLIAM A. HEINZE
INVENTORS

Albert J. Fihe
ATTORNEY

Patented Nov. 19, 1935

2,021,571

UNITED STATES PATENT OFFICE 2,021,571

LAMINATED COMPOSITION GASKET

John H. Victor, Wilmette, William A. Heinze, Chicago, and Joseph B. Victor, Oak Park, Ill., assignors to Victor Manufacturing & Gasket Company, Chicago, Ill., a corporation of Illinois Application February 21, 1934, Serial No. 712,379

1 Claim. (Cl. 154—45.5)

This invention relates to an improved laminated composition gasket and has for one of its principal objects the provision of a gasket particularly adaptable for use in manifolds of internal combustion engines but which is also available for many other purposes.

One of the important objects of this invention is to provide a composition gasket composed of a series of laminations, each lamination preferably comprising a sheet of impregnated or treated asbestos or similar packing material.

Another important object is to provide a gasket which is composed wholly of an impregnated fibrous material preferably in laminations and which, on account of this structure, is a good heat insulating material and which, furthermore, on account of the absence of any metal in its make-up, shall effectively prevent the transfer of heat from one side of the gasket to the other.

A still further important object is the provision of a laminated composition gasket composed of a plurality of layers of treated or impregnated asbestos or other packing material, which layers are securely cemented together either by an auxiliary adhesive material or by the adhesive action of the material with which the layers are originally impregnated.

Another object is to provide a relatively thick gasket composed of a plurality of laminations which shall be free from the objection of undesirable thickness in the middle or other portions thereof due to buckling which ordinarily results from the fastening and securing means heretofore employed.

Another and further important object is the provision in a laminated gasket of means for controlling the thickness thereof by varying the dimensions of the laminations and also by cutting down or shaving the exterior surfaces of the same.

An additional object of the invention is to provide in a gasket means incorporated with the surfaces thereof for providing a lubricant between the gasket and adjacent parts which is quite essential in manifold gaskets or the like where extreme changes of temperature take place and which ordinarily results in buckling of the gasket with consequent deterioration and unsatisfactory action.

Other and further important objects of the invention will be apparent from the disclosures in the accompanying drawing and following specification.

The invention, in a preferred form, is illustrated in the drawing and hereinafter more fully described.

In the drawing:—

Figure 1:
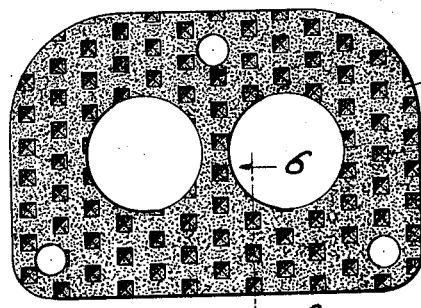
Figure 1 is a top plan view of one of the improved gaskets of this invention, showing the means for incorporating a lubricant into the surfaces thereof.

The reference numeral 10 indicates generally a gasket used in the construction of a well-known type of automobile, the same having a plurality of indentations 12 in the surfaces thereof, which indentations are for the reception and retention of a lubricating material preferably a graphite composition which is brushed, sprayed or otherwise applied to the indented surfaces of the gasket.

Figure 6:
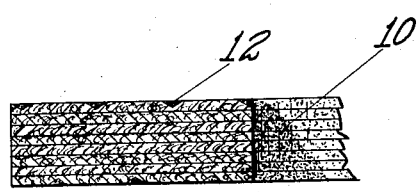
Figure 6 is a sectional view taken on the line 6—6 of Figure 1.

The gasket itself is, as best shown in Figure 6, composed of a plurality of laminations of packing material, the same being preliminarily impregnated or treated with a composition of vegetable oils of the drying or semi-drying type and later baked. Other impregnating materials may be used.

The laminations are then brought together and caused to closely adhere to each other by means of some suitable cement, preferably a phenolic resin or a phenolic plasticizer used as a glue, the layers being, in these instances, caused to adhere by the application of heat and pressure. Other suitable adhesives may also be employed and packing other than asbestos may be used such as paper or any suitable fabric or the like. It has been found, however, that the ordinary asbestos millboard commonly used in gasket construction is quite desirable for this purpose after having been impregnated with the aforesaid vegetable oils and oxidized by heat in the presence of air, after which the laminations are secured together, and it has been found that the most satisfactory adhesive is phenol resin heretofore described.

Additionally, the use of heat and pressure enables the gasket to be made in the desired thickness with considerable accuracy.

The application of a lubricant such as graphite composition to the indentations 12 which are formed in the surfaces of the gasket either before or after the original treatment enables the gasket to move with respect to contacting metal surfaces under differences of temperature such as ordinarily occur in these gaskets used in internal combustion engine construction, and the application of the graphite to indentations in the surfaces produces a lubricating action which will last as long as the gasket itself is used, even though the protuberances between the indentations 12 become worn down under such action, as the indentations are deep enough, as shown in Figure 6, to provide a suitable supply of lubricant under any and all conditions and length of use.

Figure 2:
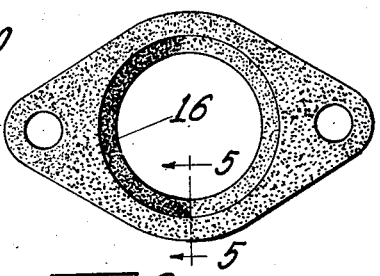
Figure 2 is a top plan view of another type gasket such as is commonly used in carbureter manifolds, and for which the product of this invention is especially applicable.
Figure 3:
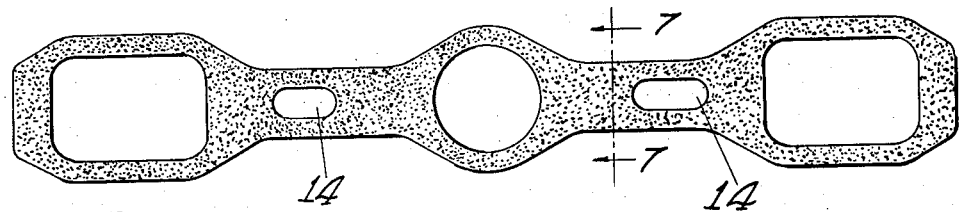
Figure 3 illustrates still a further type of manifold gasket, the same being illustrated with elongated bolt holes whereby free movement of the gasket itself with regard to the adjacent metal surfaces after the same is in position is permitted.
Figure 4:
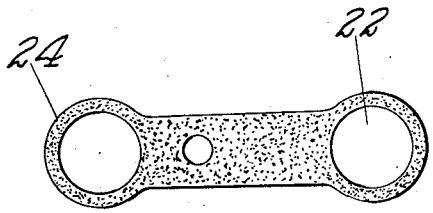
Figure 4 shows a still further type of gasket for which the product of this invention is applicable.

If desired, the graphite or other lubricant may be simply applied to the smooth surface of the gasket as shown in Figures 2, 3 and 4, this being either by brushing or spraying on a suitable graphitic composition, and in these instances, the lubricating action, while not as definite and lengthy as that produced by the construction shown in Figures 1 and 6, will still be quite satisfactory. As shown in Figure 3, the bolt holes 14 are elongated to allow of this movement of the gasket with respect to adjacent surfaces.

Figure 5:
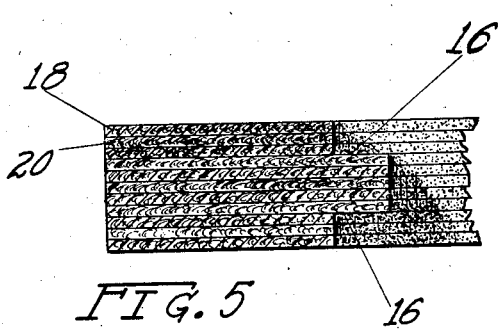
Figure 5 is an enlarged sectional view taken on the line 5—5 of Figure 2, looking in the direction indicated by the arrows, and showing a slight modification of the invention.

As shown in Figures 2 and 5, the gasket may have a countersunk annular groove 16 formed around the upper and lower internal edges thereof or at other places, if desired, this being for the purpose of accommodating certain motor and carbureter constructions, and a slight modification of the invention may be incorporated into the gasket as illustrated in Figure 5 wherein alternate layers are formed of treated and untreated asbestos respectively as shown at 18 and 20.

Paper or other packing material may be substituted for the asbestos, and the relationship of the layers may be varied to suit various desires or requirements, particularly those encountered in providing against heat transfer, it having been found that even a single layer of raw untreated asbestos in a gasket such as shown in Figure 5 is sufficient to provide quite satisfactorily against undesirable heat transfer from one face of the gasket to the other. This is particularly desirable in carbureter gaskets wherein the heat from the engine manifold has a tendency to be transmitted to the metal parts of the carbureter itself which results in an undesirable preliminary vaporization of the gasoline passing through the carbureter. The use of gaskets containing metal in their make-up aggravated this condition which is definitely remedied by the gasket of this invention. Instead of untreated asbestos, treated or untreated paper or other packing material may be employed.

The treated sheets or laminations of the improved gaskets of this invention are of considerable strength and resiliency, and can, therefore, be employed in the construction of gaskets such as shown in Figure 4 wherein relatively large openings 22 at the ends are necessary, the strength of the material of this invention being such that large openings in the side of relatively small annular peripheries can be safely and economically constructed for efficient operation.

Figure 7:
Figure 7 is an enlarged section taken on the line 7—7 of Figure 3.

As will be evident from an inspection and comparison of Figures 5 and 7, the number of laminations may be varied as desired, necessary or convenient, and the thickness of the gasket itself can be changed to accommodate any requirements such as are ordinarily encountered in these constructions.

Any suitable treating material which comprises a high heat resisting composition may be used for impregnation, and a single or homogeneous sheet may be employed with the indentations on one or both surfaces for the lubricant.

In Figure 7, the gasket is composed of a plurality of laminations 26, each lamination comprising similar treated layers of asbestos millboard suitably cemented together in a practically permanent relationship and brought to the required density and thickness by means of the heat and pressure employed in the cementing operation and also to some extent by means of the impregnating and baking operations comprising the preliminary saturation and treatment.

Figure 8:
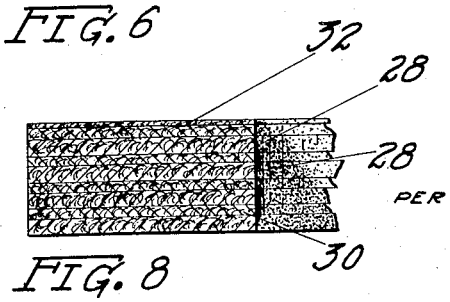
Figure 8 is a sectional view showing a still further modification of the invention.

As illustrated in Figure 8, the laminations may be of various thicknesses. For example, the laminations 28 in Figure 8 may be of approximately twice the thickness of the adjacent laminations 30 while laminations of thickness approximately one-half of the laminations 30 may also be employed as shown at 32. These combinations of different thicknesses may be varied as desired so as to produce a gasket of a requisite thickness with a minimum of labor and also producing a gasket which is sufficiently flexible for varying needs, as the construction is such that the thickness can be readily reduced by shaving or grinding off of the surfaces to produce the required height or thickness. In those gaskets heretofore used wherein metal formed part of the construction, this shaving down and grinding off was obviously impossible.

The material of this laminated gasket is such that fairly large sheets may be preliminarily impregnated and treated, and from these sheets, gaskets of larger size may be cut such as those used in automobile cylinder heads, and the manifold gaskets of this invention can then be readily and economically constructed from the scrap or salvage resulting from the die-cutting or other forming of the larger cylinder head and other gaskets.

It will be seen that herein is provided a gasket especially adapted for use in manifolds and other portions of internal combustion engines and also for various other uses, which, on account of its impermeability to heat, meets one of the crying needs in this field, and which, furthermore, on account of its toughness and resiliency, will produce a very satisfactory and efficient installation. Another very important advantage produced by the use of this device is the impregnating feature, whereby undesirable buckling is completely eliminated, and a more permanent installation inevitably results.

We are aware that many changes may be made and numerous details of construction varied throughout a wide range without departing from the principles of this invention, and we, therefore, do not purpose limiting the patent granted hereon otherwise than as necessitated by the prior art.

We claim as our invention:

A laminated composition gasket, comprising some layers of preliminarily oil treated and baked packing material and other layers of untreated material of various thicknesses, all built up with an adhesive such as a phenol resin to a desired thickness by the application of heat and pressure, the exterior surfaces having a plurality of indentations therein, and a lubricant comprising a graphite composition in said indentations.

JOHN H. VICTOR.
JOSEPH B. VICTOR.
WILLIAM A. HEINZE.